United States Patent
Kuji et al.

(10) Patent No.: US 6,776,250 B2
(45) Date of Patent: Aug. 17, 2004

(54) STRADDLE-TYPE FOUR WHEELED ALL TERRAIN VEHICLE

(75) Inventors: Yasuhiro Kuji, Akashi (JP); Yuichi Kawamoto, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 10/024,853

(22) Filed: Dec. 18, 2001

(65) Prior Publication Data

US 2002/0096377 A1 Jul. 25, 2002

(30) Foreign Application Priority Data

Jan. 19, 2001 (JP) .......................................... 2001-011362

(51) Int. Cl.$^7$ .............................................. B60K 13/02
(52) U.S. Cl. ........................ 180/68.3; 180/908; 224/401
(58) Field of Search ................................ 180/908, 291, 180/292, 233, 219, 68.3; 224/401; 296/37.1

(56) References Cited

U.S. PATENT DOCUMENTS

| | | | | |
|---|---|---|---|---|
| 5,127,560 A | * | 7/1992 | Miyamoto et al. | 224/413 |
| 6,209,941 B1 | * | 4/2001 | Cross | 296/37.1 |
| 6,695,330 B2 | * | 2/2004 | Hata | 280/152.3 |

FOREIGN PATENT DOCUMENTS

| | | | |
|---|---|---|---|
| JP | 50-73349 | * | 11/1973 |
| JP | 50-73349 A1 | | 6/1975 |
| JP | 61-61291 A1 | | 4/1986 |
| JP | 62-144784 | * | 9/1987 |
| JP | 62-144784 A1 | | 9/1987 |
| JP | 64-28082 | * | 1/1989 |
| JP | 01-172083 | | 6/1989 |
| JP | 01-178093 | | 7/1989 |
| JP | 1-178093 | * | 7/1989 |
| JP | 1-138885 A1 | | 9/1989 |
| JP | 1-138885 | * | 9/1989 |
| JP | 3-109183 | * | 5/1991 |
| JP | 03-118286 | | 5/1991 |
| JP | 3-118286 | * | 5/1991 |
| JP | 11-198878 | | 7/1999 |

* cited by examiner

Primary Examiner—Bryan Fischmann
(74) Attorney, Agent, or Firm—Marshall, Gerstein & Borun LLP (57) ABSTRACT

A straddle-type four wheeled all terrain vehicle include a vehicle body with a seat which a rider straddles. A handle is placed forward of the seat for being steered by the rider straddling the seat to operate the vehicle body. A container is provided at a portion of the vehicle body that is situated between the handle and the seat, for accommodating a small article.

7 Claims, 6 Drawing Sheets

STRADDLE-TYPE FOUR WHEELED ALL TERRAIN VEHICLE

BACKGROUND OF THE INVENTION

1. Field of the Invention

The present invention relates to a straddle-type four wheeled all terrain vehicle, and more particularly to a straddle-type four wheeled all terrain vehicle provided with a container in which small articles are accommodated.

2. Description of the Related Art

Conventionally, in a straddle-type four wheeled all terrain vehicle, a container in which small articles are accommodated (hereinafter referred to as a container for small articles or a container) is, for example, provided below a seat.

However, a rider feels inconvenience in use of the container provided below the seat, because the rider straddling the seat is incapable of staying seated (being in a seated posture) when putting small articles into/out of the container.

SUMMARY OF THE INVENTION

The present invention addresses the above-described problem, and an object of the present invention is to provide a straddle-type four wheeled all terrain vehicle provided with a container for small articles that is conveniently used by a rider.

According to the present invention, there is provided a straddle-type four wheeled all terrain vehicle comprising: a seat which a rider straddles; a handle placed forward of the seat, for being steered by the rider straddling the seat to operate a vehicle body; and a container provided at a portion of the vehicle body that is situated between the handle and the seat, for accommodating a small article.

Thereby, the rider can conveniently use the container because the rider can stay seated when putting small article into/out of the container.

In the straddle-type four wheeled all terrain vehicle, a vehicle body cover and an air cleaner may be provided at the portion of the vehicle body that is situated between the handle and the seat such that the air cleaner is covered from above by the vehicle body cover, the container may be provided between the vehicle body cover and the air cleaner by using a concave portion formed in an upper face of the air cleaner, and at least a portion of the vehicle body cover may be adapted to be opened and closed to allow the small article to be accommodated in the container.

With this configuration, since the container is covered by the vehicle body cover, an external appearance of the vehicle body is visually preferable. In addition, since the container is provided by utilizing the concave portion of the upper face of the air cleaner, a space of the vehicle body can be efficiently utilized. Further, since the air cleaner has a hollow inner portion, the concave portion can be easily formed.

Preferably, the container may be structured such that a tubular wall is vertically provided on the upper face of the air cleaner so as to surround the concave portion, and a portion of the vehicle body cover that is situated above the tubular wall may be adapted to cover/uncover an opening of the tubular wall.

Preferably, a cushion member may be provided at an inner face of the portion of the vehicle body cover that is situated above the tubular wall such that the cushion member makes contact with a tip end portion of the tubular wall when the portion of the vehicle body cover is closed.

Thereby, the concave portion of the air cleaner can be used effectively as the accommodating portion for the small articles, and the configuration of the container can be simplified.

A portion of the vehicle body cover that covers at least the concave portion may be adapted to be pivotally swung around one end of the portion of the vehicle body cover to be thereby opened and closed, and a pocket-shaped accommodating portion as the container is formed at an inner face of the portion of the vehicle body cover that covers at least the concave portion such that the accommodating portion can be accommodated in the concave portion when the portion of the vehicle body cover is closed and the accommodating portion is opened on the opposite side of a center of a swing operation of the portion of the vehicle body cover.

Preferably, a connecting hole being an outlet of the air cleaner may be formed in a lower face of the air cleaner, and the concave portion may be formed on the upper face of the air cleaner so as not to overlap with the connecting hole when seen in a plan view.

Since an increase in a fluid resistance to an air flowing into the connecting hole becomes greater as the concave portion is closer to the connecting hole seen in the plan view, the above-identified configuration is capable of suppressing the increase in the fluid resistance.

In the straddle-type four wheeled all terrain vehicle, a battery may be stored in a concave portion on a rear end portion of the vehicle body cover, for supplying a power to actuate the straddle-type four wheeled all terrain vehicle, and the concave portion is covered by the front end portion of the seat.

Thereby, the space of the vehicle can be efficiently utilized.

The above and further objects and features of the invention will be more fully be apparent from the following detailed description with accompanying drawings.

DETAILED DESCRIPTION OF THE PREFERRED EMBODIMENTS

Hereinafter, embodiments of the present invention will be described with reference to drawings.

First Embodiment

Figure 1:
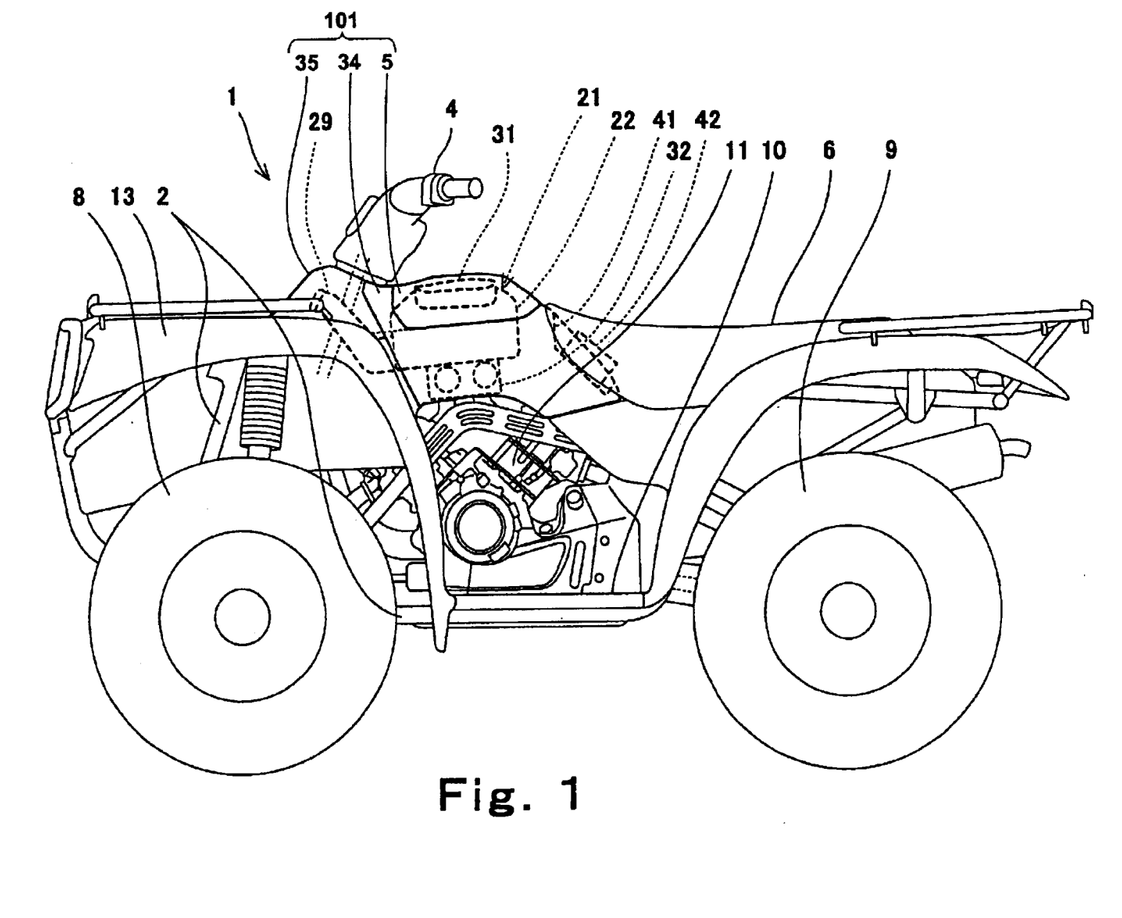
FIG. 1 is a left side view showing an entire configuration of a straddle-type four wheeled all terrain vehicle according to a first embodiment of the present invention.

FIG. 1 is a left side view showing an entire configuration of a straddle-type four wheeled all terrain vehicle according to a first embodiment of the present invention.

Referring now to FIG. 1, a straddle-type four wheeled all terrain vehicle 1 comprises a steering bar handle 4 mounted to a vehicle body frame (partially shown in FIG. 1) 2, right and left front wheels 8, and right and left rear wheels 9. The straddle-type four wheeled all terrain vehicle 1 further comprise a straddle-type seat 6 placed rearward of the handle 4 and apart a certain distance therefrom, and foot boards 10 provided on opposite sides forward and downward of the seat 6, rearward of the handle 4, and at positions substantially as high as an axle of the front wheels 8 and the rear wheels 9. The vehicle 1 is provided with a V-type engine 11 between the right and left foot boards 10 such that a lower end of the engine 11 is substantially as high as the foot boards 10. In the V-type engine 11, two cylinders are arranged forward and rearward in the longitudinal direction of the vehicle body as being inclined forward and rearward. A carburetor 32 is provided between these inclined cylinders for supplying a fuel-air mixture to the respective cylinders. An air cleaner 21 is provided immediately above the carburetor 32 for cleaning air used in the engine 11. The air cleaner 21 is positioned between the handle 4 and the seat 6. Thus, in this embodiment, a vehicle body structure in which the air cleaner 21 is placed between the handle 4 and the seat 6 is realized by using the V-type engine 11 and by inclining the two cylinders forward and rearward.

A vehicle body cover 101 is provided such that the cover 101 covers an upper portion from a front portion of the vehicle body to a front end of the seat 6. The vehicle body cover 101 is composed of a top cover 35, an air cleaner cover 5, and a side cover 34. The top cover 35 is a portion of the vehicle body cover 101 that is situated forward of the handle 4, the air cleaner cover 5 is a portion of the vehicle body cover 101 that is situated rearward of the handle 4 such that it covers the air cleaner 21 from above, and the side cover 34 is the other portion of the vehicle body cover 101. In this embodiment, the top cover 35 is formed integrally with a front fender 13 that covers the front wheels 8.

A container 31 for small articles is provided between the air cleaner 21 and the cleaner cover 5. Since the container 31 is covered by the vehicle body cover in this configuration, an external appearance of the vehicle body is visually preferable.

Figure 5:
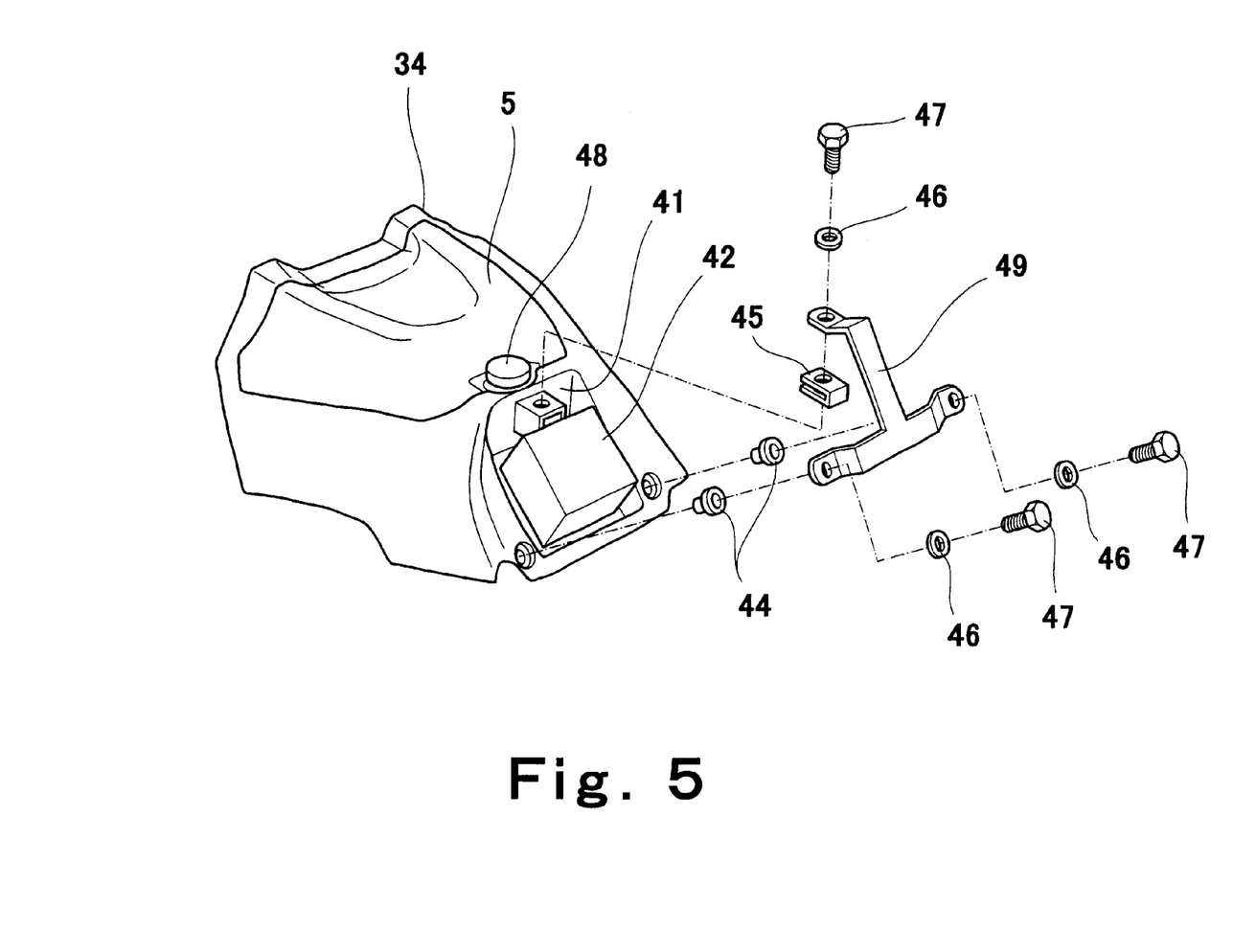
FIG. 5 is a perspective view showing a structure of a battery storage portion of FIG. 1.

The side cover 34 and the air cleaner cover 5 are entirely curved in the lateral direction of the vehicle body such that their central portions are ridge-shaped (see FIG. 5). The central ridge portions are substantially horizontal from the front end to the middle portion and downwardly inclined from the middle portion to the rear end in the longitudinal direction of the vehicle body. A rear end portion of the side cover 34 constituting a base (foot) portion of the vehicle body cover is covered by a front end portion of the seat 6. A battery storage portion 41 is formed in the rear end portion of the side cover 34, for storing a battery 42. The battery 42 is an electric power source for supplying an electric power to actuate the straddle-type four wheeled all terrain vehicle 1.

Hereinafter, a structure of the container 31 will be described in detail.

Figure 2:
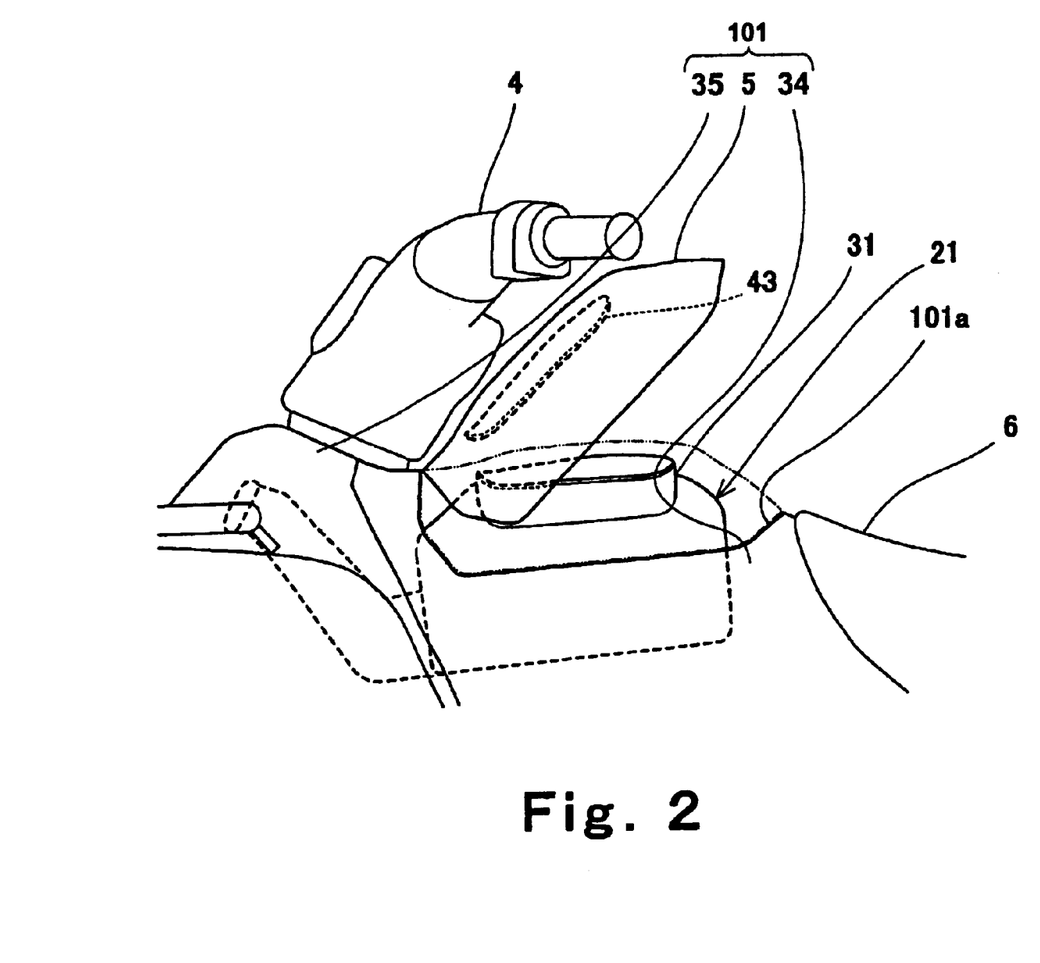
FIG. 2 is a partially enlarged left side view showing a configuration of a container for small articles of FIG. 1.
Figure 3:
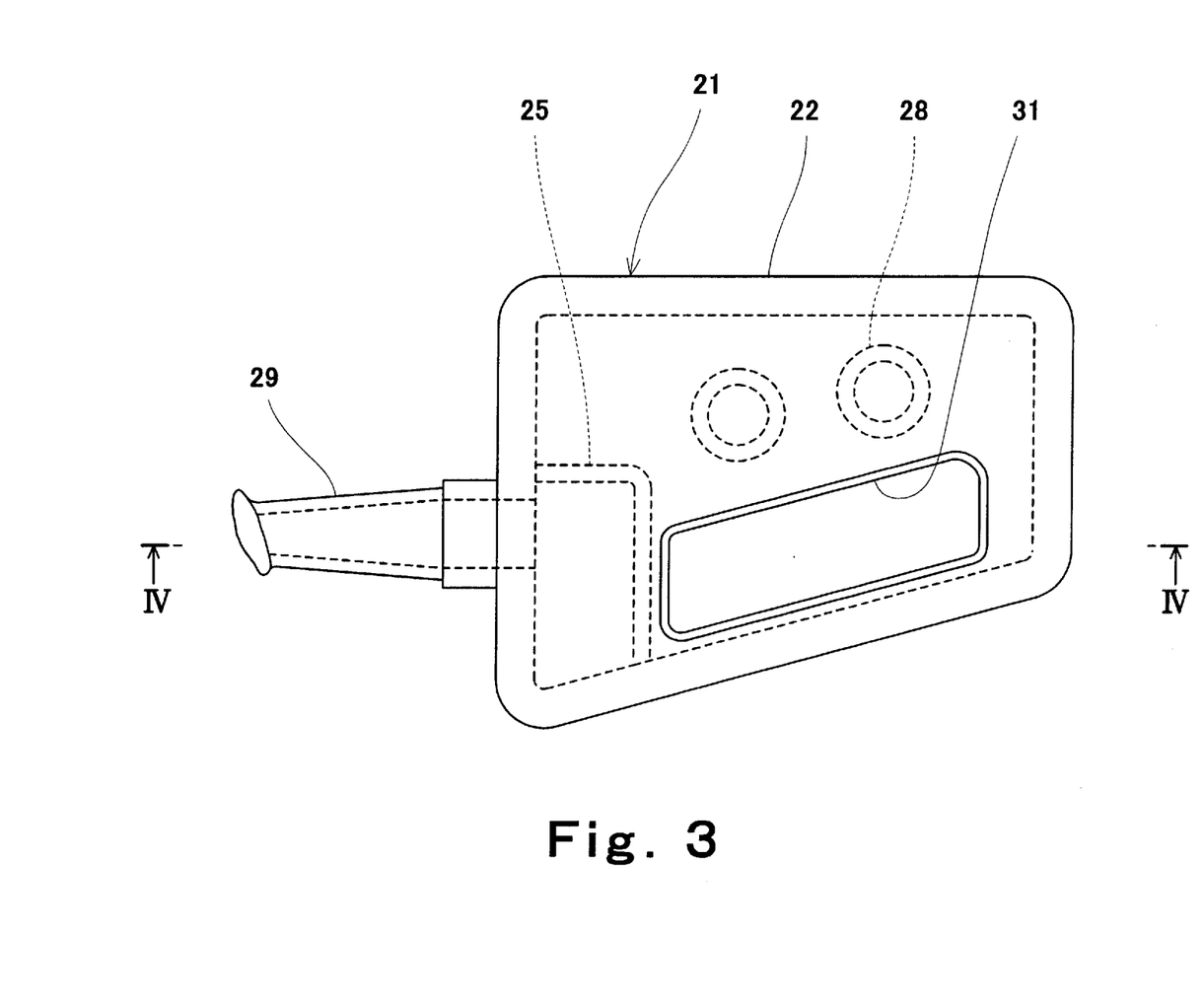
FIG. 3 is a plan view showing a structure of the container for small articles of FIG. 1 and a structure of an air cleaner.
Figure 4:
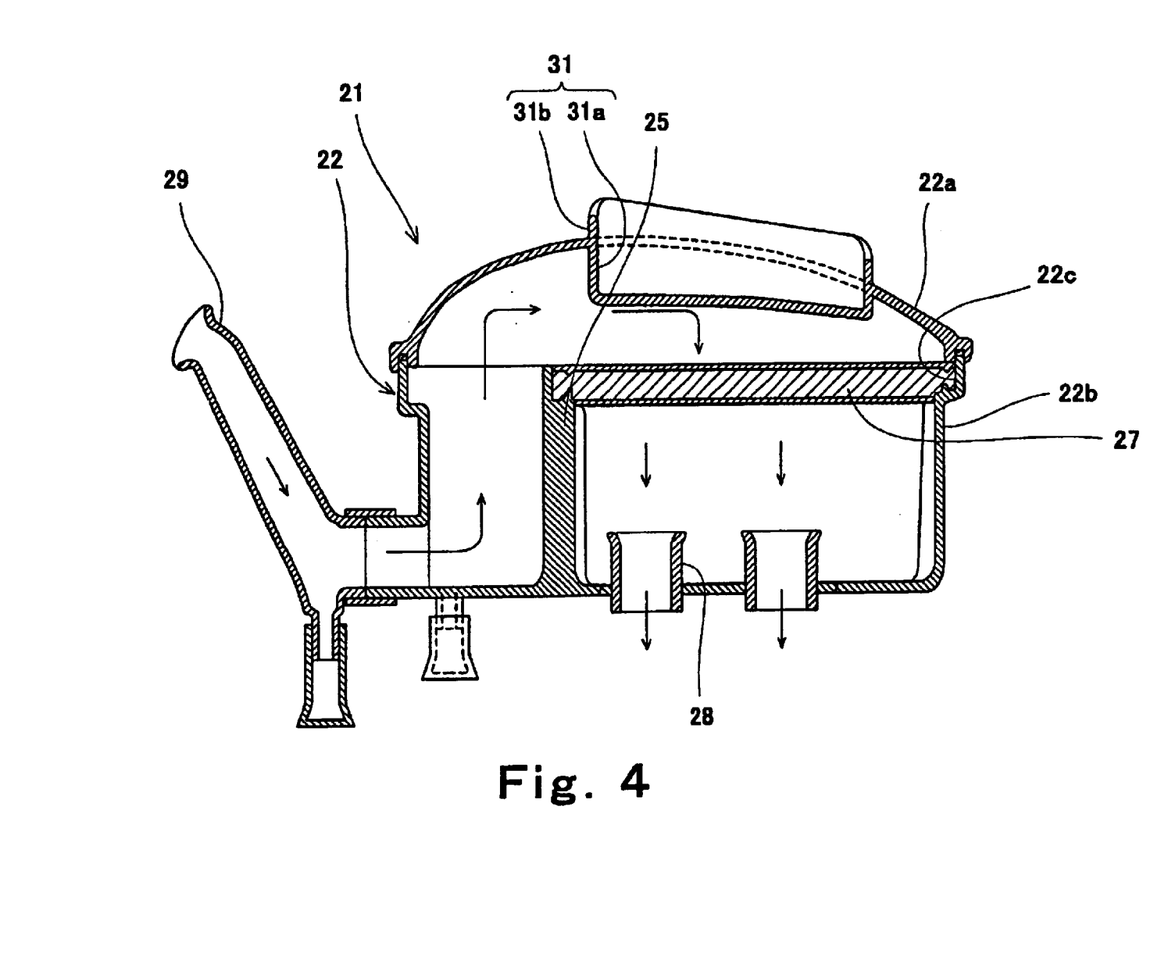
FIG. 4 is a cross-sectional view taken substantially along line IV—IV of FIG. 3.

FIG. 2 is a partially enlarged left side view showing the structure of the container for small articles of FIG. 1. FIG. 3 is a plan view showing the structure of the container of FIG. 1 and a structure of an air cleaner. FIG. 4 is a cross-sectional view taken substantially along line IV—IV of FIG. 3.

Referring to FIG. 2, the portion of the vehicle body cover 101 that is situated rearward of the handle 4 is composed of the air cleaner cover 5 that covers the air cleaner 21 from above and the side cover 34 as the other portion. The air cleaner cover 5 and the side cover 34 are made separately. To be more detailed, the portion which should cover the air cleaner 21 from above is the air cleaner cover 5 as being separable from the side cover 34 and an opening 101a is formed in an upper portion of the side cover 34 corresponding to the air cleaner cover 5. A front end portion of the air cleaner cover 5 is attached to a front end portion of the opening 101a of the side cover 34 by means of a mounting member (not shown) such that the air cleaner cover 5 is pivotally swingable at the front end around an axis (not shown) extending in the lateral direction. In order to satisfactorily uncover the opening 101a, the air cleaner cover 5 is removable from the side cover 34 when brought to an upwardly swung position, i.e., a raised position. So, when the air cleaner cover 5 is closed/raised, the opening 101a is covered/uncovered.

As shown in FIGS. 3, 4, the air cleaner 21 has a body 22 and an intake duct 29 provided at a lower portion of a front face of the body 22. The body 22 has a container-shaped body box 22b including a cleaner element accommodating portion 22c and opened in an upper end portion thereof, and a lid portion 22a joined to the upper end portion of the body box 22b. The lid portion 22a is removably fixed to the body box 22b by means of a fixing member (not shown). Connecting holes 28 being outlet of the air cleaner and connected to the carburetor are formed in a lower face of the body 22. In this embodiment, the connecting holes 28 are formed by funnels penetrating through a bottom wall of the body 22. The interior of the body 22 is structured such that a separating wall 25 vertically provided between an opening of the intake duct 29 and the connecting holes 28 defines a fluid passage of the air inflowing through the opening to the connecting holes 28 and a cleaner element or air (filter) 27 is horizontally provided over the entire cross section of the fluid passage. Thereby, the air taken into the body 22 through the intake duct 29 is cleaned by the cleaner or air element 27 and the resulting clean air is flowed to the carburetors through the connecting holes 28.

As shown in FIGS. 2 to 4, a concave portion 31a is formed in an upper face of the body 22 of the air cleaner 21. A tubular wall 31b is vertically provided on the entire peripheral portion of the concave portion 31a. The concave portion 31a is formed by recessing a wall portion of the lid portion 22a of the body 22. As can be clearly seen in FIG. 3, the concave portion 31a is formed at a position on the lid portion 22a of the body 22 so as not to overlap with the connecting holes 28 when seen in the plan view. When the concave portion 31a is formed so as to overlap with the connecting holes 28, the concave portion 31a makes the fluid passage of the air in the air cleaner 21 narrower to cause an increase in a fluid resistance to the air. In view of this fact, to suppress the increase in the fluid resistance, the concave portion 31a is positioned apart from the connecting holes 28.

The tubular wall 31b is formed integrally with the lid portion 22a of the body 22 and an inner peripheral face thereof is continuous with an inner face of the concave portion 31a. The tubular wall 31b has a height for allowing some clearance to be provided between the upper end of the tubular wall 31b and the inner face of the closed air cleaner cover 5. The concave portion 31a and the tubular wall 31b constitute the container 31. As should be appreciated, in this embodiment, since the container 31 is formed by utilizing the concave portion 31a formed on the upper face of the air cleaner 21, a space of the vehicle body can be efficiently utilized. In addition, since the air cleaner 21 has a hollow inner portion, the concave portion 31 can be easily formed.

A plate-shaped cushion member 43 is provided at a portion of the inner face of the air cleaner cover 5 that is situated above the container 31 in the closed state of the air cleaner cover 5. The cushion member 43 is, for example, made of sponge, and has a thickness sufficient to be dented to some degree when the air cleaner cover 5 is brought to a closed position and the member 43 makes contact with a tip end of the tubular wall 31b. The cushion member 43 and the air cleaner cover 5 constitute a door of the container 31.

The air cleaner cover 5 also serves as a door for maintenance of the air cleaner 21. Specifically, by opening (raising) the air cleaner cover 5, the upper portion of the air cleaner 21 is exposed. In this state, the lid portion 22a of the body 22 is detached to allow the air element 27 to be replaced or the interior of the element accommodating portion 22b to be cleaned. Since the door only for maintenance of the air cleaner 21 can be dispensed with, the configuration of the vehicle body cover 101 can be simplified.

Subsequently, a battery storage portion 41 will be described. FIG. 5 is a perspective view showing a structure of the battery storage portion of FIG. 1.

Referring to FIG. 5, a concave area is formed in a rear end portion of an outer face of the side cover 34 and constitutes the battery storage portion 41. A battery 42 is stored in the battery storage portion 41. A battery holder 45 is mounted to an opening of the battery storage portion 41 by means of mounting members 44, 45, 46, 47, and 49 to thereby secure the battery 42. Reference numeral 48 denotes a button for opening and closing. The button 48 is omitted in FIGS. 1, 2. Thus, in this embodiment, since the battery storage portion 41 is provided at the rear end portion of the side cover 34 that is situated below the seat 6, the space of the vehicle body can be more efficiently utilized.

Hereinafter, the manner in which the above-described container is used will be explained.

Referring to FIGS. 1 to 5, in operation, the rider straddles the seat 6, placing the rider's feet on the foot boards 10, and grips the handle 4 with both hands to operate the vehicle 1.

When the rider wants to put a small article into the container 31, the rider operates the button 48 for fixing the air cleaner cover 5 to the side cover to open the air cleaner cover 5.

Then, the rider puts the small article into the container 31 and closes the air cleaner cover 5. When the air cleaner cover 5 is brought to the closed position, the cushion member 43 makes contact with the tip end of the container 31 (tubular wall 31b) and is dented, thereby closing the container 31 and sealing it.

From the foregoing description, it is to be understood that in this embodiment, the rider straddling the seat 6 can put the small article into/out of the container 31 in the seated posture. In brief, the rider can conveniently use the container 31.

Second Embodiment

Figure 6:
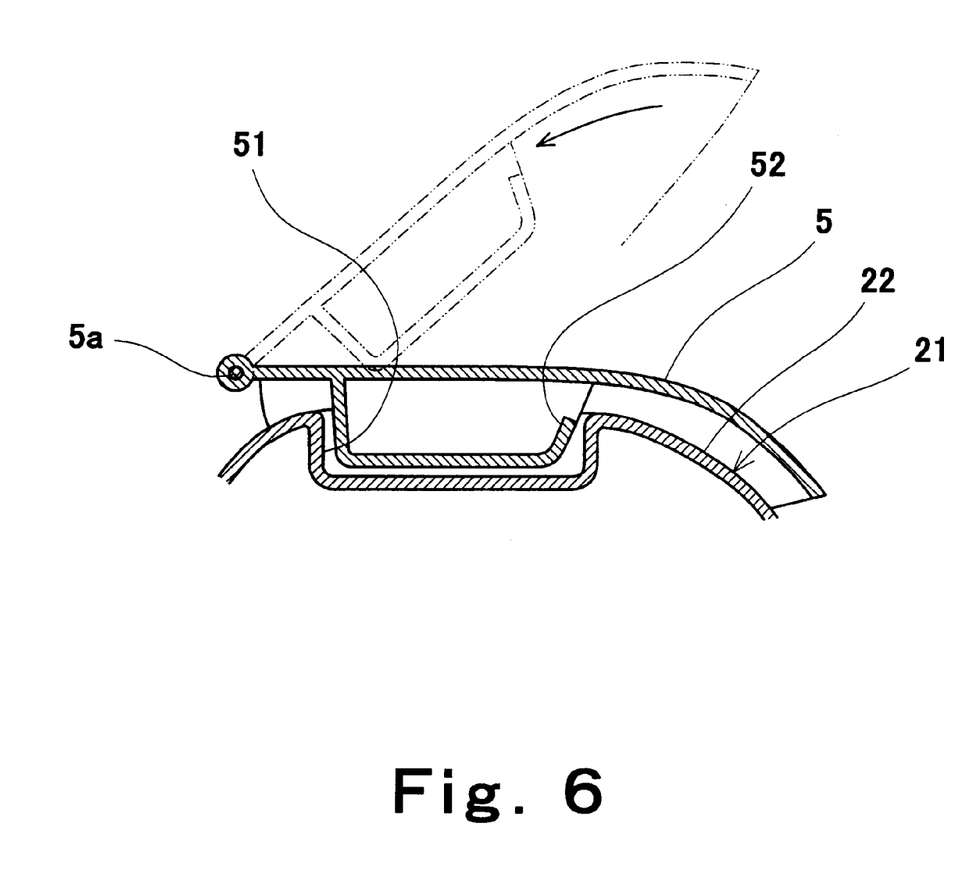
FIG. 6 is a cross-sectional view showing a structure of a container for small articles of a straddle-type four wheeled all terrain vehicle according to a second embodiment of the present invention.

FIG. 6 is a cross-sectional view showing a structure of a container for small articles of a straddle-type four wheeled all terrain vehicle according to a second embodiment of the present invention.

In FIG. 6, the same reference numerals as those in FIG. 2 denote the same or the corresponding parts. A concave portion 51 is formed in the upper face of the body 22 of the air cleaner 21. A pocket-shaped container 52 for small articles is formed at a portion of the inner face of the air cleaner cover 5 that is situated above the concave portion 51 in the closed state of the air cleaner cover 5. The container 52 can be accommodated in the concave portion 51 in the closed state of the air cleaner cover 5, and is opened on the opposite side of a swing center 5a of a swing operation of the air cleaner cover 5, i.e., the rear side of the container 52 is opened. In other respects, this embodiment is identical to the first embodiment.

Also in this embodiment, the rider straddling the seat 6 can open the air cleaner cover 5 to put the small article into/out of the container 52 in the seated posture. In brief, the rider can conveniently use the container 52.

While in the first embodiment, the door for this container serves as the door for maintenance of the air cleaner, it may be used exclusively as the door of the container for the small article. In this case, only the portion of the vehicle body cover that is situated right above the container may be used as the door. Other types of the door, for example, of a slide type may be used provided that the door is capable of covering/uncovering an inlet of the container.

While in the first and second embodiments, only the air cleaner cover is opened/closed, the side cover and the air cleaner cover may be made smaller and these covers may be opened/closed.

While in the first and second embodiments, the air cleaner cover is pivotally swung upwardly and forwardly around the axis provided at the front end of the cover to extend in the lateral direction, that is, the rear side of the air cleaner cover is opened, the cover may be pivotally swung toward an arbitrary direction, for example, upwardly and laterally.

While in the first embodiment, the container is constituted by the concave portion formed in the upper face of the air cleaner and the tubular wall, this may be constituted only by the tubular wall.

While in the first embodiment, the tubular wall is formed on the periphery of the concave portion, this may surround the periphery to keep large space.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A straddle-type four wheeled all terrain vehicle comprising:

a vehicle body having a seat capable of holding a rider;

a handle placed forward of the seat and capable of being steered by the rider; and a container provided at a portion of the vehicle that is situated between the handle and the seat, wherein a vehicle body cover and an air cleaner are provided at a location between the handle of the vehicle body and the seat such that the air cleaner is covered by the vehicle body cover, the air cleaner has a container-shaped element accommodating portion with an open upper end and a removable lid portion fitted to the open upper end of the element accommodating portion, and a small article storage concave portion is provided on an upper face of the lid portion to be used as at least part of the container or a space for accommodating the container, and an air cleaner cover is provided as part of the vehicle body cover so as to cover the air cleaner and is opened and closed to allow both access into the container and access to a cleaner element to be changed by removing and attaching the lid portion.

2. The straddle-type four wheeled all terrain vehicle according to claim 1, wherein the small article storage concave portion is used as at least part of the container.

3. The straddle-type four wheeled all terrain vehicle according to claim 1, wherein a tubular wall is vertically provided to surround the small article storage concave portion, and the small article storage concave portion and the tubular wall form the container, and a portion of the air cleaner cover that is located above the tubular wall is configured to cover and uncover an opening formed by the tubular wall.

4. The straddle-type four wheeled all terrain vehicle according to claim 3, wherein a cushion member is provided at an inner face of the portion of the vehicle body cover that is situated above the tubular wall such that the cushion member makes contact with a tip end portion of the tubular wall when the portion of the vehicle body cover is closed.

5. The straddle-type four wheeled all terrain vehicle according to claim 1, wherein a portion of the vehicle body cover that covers at least the small article storage concave portion is adapted to be pivotally swung around one end of the portion of the vehicle body cover to be thereby opened/closed, and the container is a pocket-shaped accommodating portion formed at an inner face of the portion of the vehicle body cover that covers at least the small article storage concave portion such that the pocket shaped accommodating portion can be accommodated in the small article storage concave portion when the portion of the vehicle body cover is closed and the pocket shaped accommodating portion is opened on the opposite side of a center of a swing operation of the portion of the vehicle body cover.

6. The straddle-type four wheeled all terrain vehicle according to claim 1, wherein a connecting hole being an outlet of the air cleaner is formed in a lower face of the air cleaner, and the small article storage concave portion is formed on the upper face of the air cleaner so as not to overlap with the connecting hole when seen in a plan view.

7. The straddle-type four wheeled all terrain vehicle according to claim 1, wherein a battery is stored in a battery storage concave portion on a rear end portion of the vehicle body cover, for supplying power to actuate the straddle-type four wheeled all terrain vehicle, and the battery storage concave portion is covered by the front end portion of the seat.

* * * * *